(12) United States Patent  
Glaesser

(10) Patent No.: US 7,518,329 B2  
(45) Date of Patent: Apr. 14, 2009

(54) METHOD AND DEVICE FOR CUTTING FREEFORM SURFACES BY MILLING

(75) Inventor: Arndt Glaesser, Dachau (DE)

(73) Assignee: MTU Aero Engines GmbH, Munich (DE)

(*) Notice: Subject to any disclaimer, the term of this patent is extended or adjusted under 35 U.S.C. 154(b) by 68 days.

(21) Appl. No.: 10/552,300

(22) PCT Filed: Jul. 2, 2004

(86) PCT No.: PCT/DE2004/001411

§ 371 (c)(1),  
(2), (4) Date: Nov. 2, 2006

(87) PCT Pub. No.: WO2005/005082

PCT Pub. Date: Jan. 20, 2005

(65) Prior Publication Data  
US 2007/0172320 A1     Jul. 26, 2007

(30) Foreign Application Priority Data  
Jul. 8, 2003     (DE) .............................. 103 30 828

(51) Int. Cl.  
*G05B 19/10* (2006.01)

(52) U.S. Cl. .................. 318/567; 318/573; 318/574; 700/160

(58) Field of Classification Search ............. 318/570, 318/571, 568.15, 568.17; 83/74; 700/160; 702/105; 409/131  
See application file for complete search history.

(56) References Cited

U.S. PATENT DOCUMENTS

| RE30,757 | E | * | 10/1981 | Gerber ........................... 83/74 |
| 4,596,501 | A | * | 6/1986 | Wu ............................ 409/131 |
| 4,945,487 | A | * | 7/1990 | Kimura et al. .............. 700/160 |
| 5,563,484 | A | | 10/1996 | Otsuki et al. |
| 5,834,623 | A | * | 11/1998 | Ignagni ...................... 702/105 |

FOREIGN PATENT DOCUMENTS

| EP | 0 484 539 A1 | 5/1992 |
| JP | 04-74205 | 3/1992 |

* cited by examiner

*Primary Examiner*—Paul Ip  
(74) *Attorney, Agent, or Firm*—Crowell & Moring LLP

(57) ABSTRACT

A method and a device for cutting freeform surfaces is disclosed. In 5-axis cutting, a workpiece is milled by a tool, i.e., a milling cutter, in such a way that a desired freeform surface is obtained. The tool is moved for cutting along at least one tool path, i.e., cutting path, defined on the basis of interpolation points in relation to the workpiece. According to this invention, a tool vector in the form of leading angles and setting angles is defined for each interpolation point on the tool path. For each interpolation point a normal vector is determined from the leading angles and the setting angles and also from a drive vector determined for each interpolation point. The normal vector in each interpolation point on the tool path is used for a 3D-radius correction for equalizing/compensating for deviations in dimensions of the milling cutter.

13 Claims, 1 Drawing Sheet

METHOD AND DEVICE FOR CUTTING FREEFORM SURFACES BY MILLING

This application claims the priority of International Application No. PCT/DE2004/001411, filed Jul. 2, 2004, and German Patent Document No. 103 30 828.8, filed Jul. 8, 2003, the disclosures of which are expressly incorporated by reference herein.

BACKGROUND AND SUMMARY OF THE INVENTION

The present invention relates to a method for cutting freeform surfaces by milling. In addition, this invention relates to a device for cutting freeform surfaces by milling.

The present invention relates to the field of cutting technology, in particular by HSC (high-speed cutting), also known as HPC (high-performance cutting).

In cutting freeform surfaces by milling, a tool called a milling cutter is moved in relation to the workpiece. Cutting causes wear on the tool, namely the milling cutter, so the milling cutter must be replaced at certain intervals or must be reground. This may result in changes in dimension of the tool, i.e., the milling cutter. Taking into account, i.e., compensating for deviations in dimensions, changes in dimensions of the milling cutter during cutting is known as radius correction, i.e., cutter radius correction.

Cutting machines and/or NC controls for cutting machines that allow such a cutting radius correction in 3-axis cutting are known in the state of the art. In 3-axis cutting, the milling cutter is moved in three translational axes in relation to the workpiece to be machined. If such a milling cutter radius correction is performed in 3-axis cutting, it is a 2D-radius correction.

Complex freeform surfaces such as those encountered in the manufacture of rotors having integral blades, for example, must be performed with the help of so-called 5-axis cutting, i.e., in addition to the movement of the milling cutter along the three translational axes, movement thereof along two rotational axes is also required. According to the state of the art, it has not so far been possible to utilize a radius correction function in 5-axis cutting. A correction in 5-axis cutting would be a 3D-radius correction.

Against this background, the object of the present invention is to provide a novel method for cutting freeform surfaces and a corresponding device.

According to this invention, a tool vector in the form of leading angles and setting angles is defined for each interpolation point on the tool path. In addition, a normal vector is determined for each interpolation point from the leading angles and the setting angles as well as from a drive vector determined for each interpolation point. The normal vector at each interpolation point of the tool path is used for a 3D-radius correction for equalizing deviations in dimensions of the milling cutter. With the help of the invention as proposed here, it is possible for the first time to perform a radius correction, namely a 3D-radius correction, in 5-axis cutting.

According to an advantageous refinement of the present invention, to determine the normal vector for each interpolation point, in a first step the tool vector of the particular interpolation point is rotated back about the corresponding drive vector by the amount of the particular setting angle, thus yielding a first intermediate vector for the particular interpolation point. Then, in a second step, the cross product of the first intermediate vector of the particular interpolation point and the drive vector of the particular interpolation point is formed, this cross product yielding a second intermediate vector for the interpolation point. Then, in a third step, the first intermediate vector of the particular interpolation point is rotated back about the second intermediate vector of the particular interpolation point by the amount of the particular leading angle, thus yielding the normal vector for the interpolation point.

Preferred embodiments of this invention are derived from the following description.

BRIEF DESCRIPTION OF THE DRAWINGS

Exemplary embodiments of the present invention are explained in greater detail below with reference to the drawing, without being limited to these embodiments. The drawing shows.

DETAILED DESCRIPTION OF THE DRAWINGS

Figure 1:
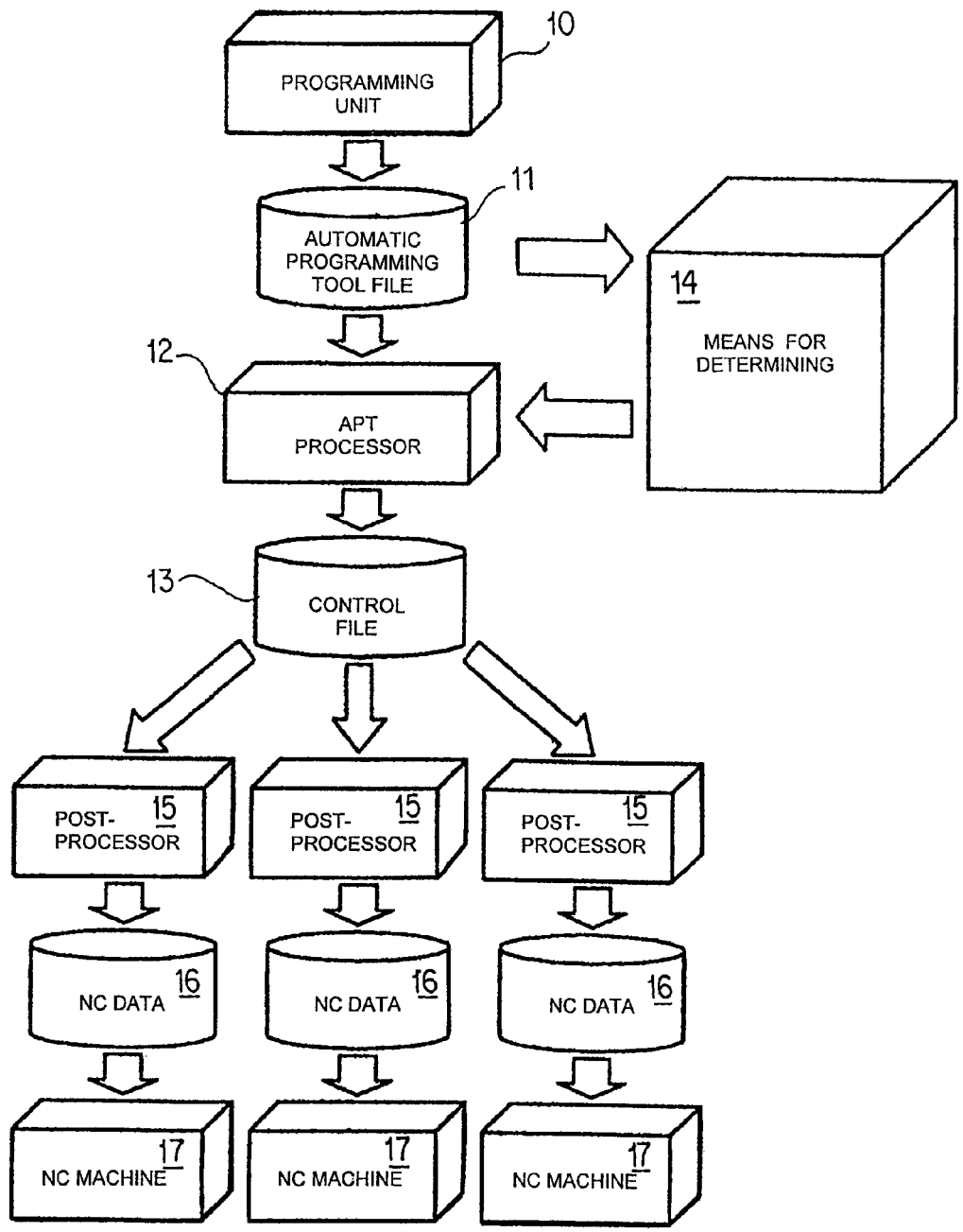
FIG. 1 is a highly schematic block diagram of an inventive device for cutting freeform surfaces.

The present invention is described in greater detail below with reference to the figure. However, before describing the details of the inventive method and the inventive device, a few terms to which reference will be made later will first be defined below.

In cutting a workpiece that is to be machined, a desired three-dimensional geometry should be created at the surface of the workpiece. This desired three-dimensional geometry at the surface of the workpiece is also known as the freeform surface.

A workpiece to be machined is cut with the help of a tool known as a milling cutter. To machine the workpiece the tool, i.e., the milling cutter, is moved in relation to the workpiece. The movement of the tool, i.e., milling cutter, in relation to the workpiece is described by so-called tool coordinates, where the tool coordinates define the position of the tip of a tool or the reference point of a tool. The movement of the tip of the tool and/or the reference point of the tool in cutting the workpiece is referred to as the tool path and/or the cutting path. The tool paths are defined in the form of interpolation points in a CAD/CAM system.

Starting from the tip of a tool and/or the reference point of a tool, a vector extends along a tool axis and/or a tool shaft of the tool and/or milling cutter. This vector along the tool axis starting from the tip of the tool and moving in the direction of the tool shaft is also referred to as the tool vector.

Machining of a workpiece to form a defined three-dimensional freeform surface is performed with the help of so-called 5-axis cutting. In 5-axis cutting, the tool can be moved in five axes in relation to the workpiece to be machined. Three axes serve to provide a linear relative movement of the tool in relation to the workpiece so that each point can be approached in space. In addition to this linear movement along the so-called linear axes, the tool is also movable about a swivel axis and a tilt axis in order to implement undercuts. Rotational movements of the tool are possible along the swivel axis and the tilt axis. This makes it possible to approach any points in space without a collision. The swivel axis and the tilt axis are frequently also referred to in general as round axes.

It is now within the scope of the present invention to propose a method and a device for 5-axis cutting of freeform surfaces, whereby in each interpolation point of the tool path or each tool path, a 3D-radius correction is performed for equalizing deviations in dimensions and/or changes in dimensions of the milling cutter. To do so, for each interpolation point on each tool path a tool vector in the form of leading angles and setting angles is defined. In addition, a drive vector of the milling cutter is defined for each interpolation point on each tool path. Then a normal vector is determined for each interpolation point on each tool path on the basis of the above variables, namely the leading angles, the setting angles and the drive vectors. Then a 3D-radius correction can be performed on the basis of this normal vector for each interpolation point.

It is thus within the scope of the present inventive method to select a specific form for defining the tool vectors. This form for defining the tool vectors uses leading angles and setting angles. In addition, in the sense of the present invention, a quantity is derived from these angles and drive vectors, which are determined using the interpolation points on the tool paths, namely the quantity being derived is the normal vector which is supplied as the input variable to a 3D-radius correction function and which can be processed by a 3D-radius correction function. On the basis of the present invention, it is possible for the first time to execute 3D-radius corrections in 5-axis cutting.

As already mentioned, the tool path or each tool path of the tool vector is defined for each interpolation point in the form of leading angles and setting angles. In addition, a drive vector is also determined for each interpolation point.

According to a first embodiment of the method, at each interpolation point of the tool path, the corresponding drive vector is determined by placing a vector through the corresponding interpolation point and a neighboring interpolation point. For the first interpolation point of each tool path, the drive vector is determined by placing a vector through the first interpolation point and the next leading angle interpolation point in the direction of movement, i.e., the second interpolation point of the tool path. For each additional interpolation point of the tool path, the drive vector is determined by placing a vector through the interpolation point and the next interpolation point toward the rear in the direction of movement.

If we let DV denote the drive vectors and SP denote the interpolation points on the tool path, where the tool path has n interpolation points, the following would thus hold:

$$DV_{SPi}=f(SP_i,SP_{i+1}), \text{ for } i=1;$$

$$DV_{SPi}=f(SP_i,SP_{i-1}), \text{ for } i=2, 3, \ldots, n.$$

Alternatively, the drive vectors for the interpolation points may also be determined by placing a spline through all interpolation points on a tool path. The first derivation of the spline in each of the interpolation points then corresponds to the drive vector of the corresponding interpolation point.

After determining the drive vectors, there is thus for each interpolation point on a tool path a tool vector defined in leading angle and setting angle as well as a drive vector. Then a normal vector can be determined from the leading angles, setting angles and drive vectors for each interpolation point.

The normal vector for each interpolation point is determined by rotating the tool vector of the particular interpolation point back about the corresponding drive vector by the amount of the particular setting angle in a first step, which yields a first intermediate vector for the particular interpolation point. In a second step, the cross product of the first intermediate vector of the particular interpolation point and the drive vector of the particular interpolation point is formed, this cross product yielding a second intermediate vector for the interpolation point. Then in a third step the first intermediate vector of the particular interpolation point is rotated back about the second intermediate vector of the particular interpolation point by the amount of the particular leading angle, this yielding the normal vector for the interpolation point. The result is then the normal vector for the corresponding interpolation point. This normal vector is used as the input variable for the 3D-radius correction.

It should be pointed out here that in defining the tool vectors on the basis of the leading angles and the setting angles, the position of the milling cutter with respect to the part to be machined, i.e., cut, is also defined. Depending on whether the milling cutter is in contact with the part to be cut on the right or on the left, this determines the plus or minus sign of the leading angles and the setting angles.

It should be pointed out again that in the sense of the present invention, the tool vectors are defined by using leading angles and setting angles. It is a finding of the present invention that a suitable input variable, namely the normal vector, can be determined for the 3D-radius correction function exclusively by defining the tool vectors in the form of leading angles and setting angles. Other methods of defining tool vectors, namely constant tool vectors and interpolated tool vectors, are not suitable.

FIG. 1 shows a highly schematic block diagram of a device according to this invention for cutting freeform surfaces. In the exemplary embodiment shown here, the device according to this invention includes a programming unit 10 for programming at least one tool path and/or cutting path of a cutting tool based on interpolation points. The tool, i.e., the milling cutter, is movable along these tool paths, which are defined in the programming unit 10, in relation to the workpiece.

The first programming unit 10 is a CAD/CAM system. In this CAD/CAM system the tool paths and/or cutting paths of the tool and/or the tool vectors are programmable on the basis of leading angles and setting angles. The CAD/CAM system generates a so-called APT (automatic programming tool) file 11, where an APT processor 12 generates a machine-independent control file 13 from the APT file 11 for machining the workpiece by cutting.

The programming unit 10 is assigned means 14 for determining a drive vector and a normal vector for each interpolation point. This is accomplished in the manner described above. The means 14 determined from the APT file 11 the drive vector and the normal vector for each interpolation point on the tool path, whereby the means 14 supply the normal vector in the form of APT data. This APT data is transferred to the APT processor 12 and integrated into the machine-independent control file 13.

With the help of so-called postprocessors 15 so-called NC data 16 is generated from the control file 13; this data is machine-dependent and is used to control the individual axes of movement of the NC machine 17, i.e., the cutting machine. The data on the normal vectors contained in the control file 13 is also contained in the NC data 16, this data on the normal vectors being transferred to a 3D-radius correction unit which is integrated into the NC machine 17 and executes the 3D-radius correction.

With the help of the inventive method and the inventive device, it is possible to greatly improve the cutting of freeform surfaces. Thus with the help of this invention it is possible for the first time to use a 3D-radius correction in a 5-axis cutting movement.

The inventive device and the inventive method are suitable in particular for machining rotationally symmetrical turbine parts having integral blades, i.e., so-called blisks (bladed disks) or blings (bladed rings).

The invention claimed is:

1. A method for cutting freeform surfaces on workpieces by milling, in particular for 5-axis cutting, whereby a workpiece is cut by a tool such that a desired freeform surface is obtained and whereby the tool for cutting is moved along at least one tool path that is defined on a basis of interpolation points in relation to the workpiece, comprising the steps of:
  a) designing a tool vector in a form of leading angles and setting angles for each interpolation point on the tool path;
  b) determining a normal vector for each interpolation point from the leading angles and the setting angles as well as from a drive vector determined for each interpolation point; and
  c) using the normal vector at each interpolation point on the tool path for a 3D-radius correction for compensating for deviations in dimension of the tool.

2. The method according to claim 1, wherein the drive vector at each interpolation point on the tool path is determined by placing a vector through the interpolation point and a neighboring interpolation point.

3. The method according to claim 2, wherein the drive vector is determined for a first interpolation point on the tool path by placing a vector through the first interpolation point and a next leading angle interpolation point in a direction of movement.

4. The method according to claim 3, wherein for each additional interpolation point on the tool path the drive vector is determined by placing a vector through the interpolation point and a next interpolation point to a rear in the direction of movement.

5. The method according to claim 1, wherein the drive vector is determined at each interpolation point on the tool path by placing a spline through all interpolation points on the tool path whereby a first derivation of the spline in an interpolation point corresponds to the drive vector of the corresponding interpolation point.

6. The method according to claim 1, wherein for determination of the normal vector for each interpolation point, in a first step, the tool vector of a particular interpolation point is rotated back about a corresponding drive vector by an amount of a corresponding setting angle, yielding a first intermediate vector for the particular interpolation point.

7. The method according to claim 6, wherein in a second step, a cross product of the first intermediate vector of the particular interpolation point and the drive vector of the particular interpolation point is formed, the cross product yielding a second intermediate vector for the particular interpolation point.

8. The method according to claim 7, wherein in a third step, the first intermediate vector of the particular interpolation point is rotated back about the second intermediate vector of the particular interpolation point by an amount of a corresponding leading angle, yielding the normal vector for the particular interpolation point.

9. A device for cutting freeform surfaces on workpieces, in particular a 5-axis cutting device, whereby a tool cuts a workpiece such that a desired freeform surface is obtained, having a programming unit for programming at least one tool path through interpolation points wherein the tool for cutting is movable along the tool path or each tool path in relation to the workpiece, wherein a tool vector in a form of leading angles and setting angles is programmable in the programming unit for each interpolation point, and the programming unit is assigned means to determine a drive vector and a normal vector for each interpolation point, and wherein the normal vector of each interpolation point is supplied to a 3D-radius correction unit.

10. The device according to claim 9, wherein the programming unit is designed for programming the tool path or each tool path as a CAD/CAM system, wherein the CAD/CAM system generates at least one APT file convertible by at least one downstream postprocessor into at least one NC file executable by the cutting device.

11. The device according to claim 9, wherein the means that are assigned to the programming unit determine the drive vector and the normal vector for each interpolation point on the tool path from an APT file generated by a CAD/CAM system, wherein the means supply the normal vector in a form of APT data and the APT data is transferred to an APT processor which integrates the APT data into a machine-independent control file such that a 3D-radius correction is executable in an NC machine which includes the 3D-radius correction unit.

12. A device for cutting freeform surfaces on workpieces, comprising:
  a programming unit for programming a tool path through interpolation points, wherein a tool vector in a form of a leading angle and a setting angle is programmable in the programming unit for each interpolation point;
  a processor for determining a drive vector and a normal vector for each interpolation point, wherein the normal vector is determined from the tool vector and the drive vector; and
  a 3D-radius correction unit, wherein the normal vector of each interpolation point is supplied to the 3D-radius correction unit.

13. A method for cutting freeform surfaces on workpieces by milling, comprising the steps of:
  a) defining a tool vector in a form of a leading angle and a setting angle for each interpolation point on a tool path for a milling cutter;
  b) determining a drive vector for each interpolation point on the tool path;
  c) determining a normal vector for each interpolation point on the tool path based on the leading angle, the setting angle, and the drive vector determined for each interpolation point; and
  d) performing a 3D-radius correction on the milling cutter based on the normal vector at each interpolation point on the tool path.

* * * * *